United States Patent [19]

Maydan et al.

[11] Patent Number: 4,618,262
[45] Date of Patent: Oct. 21, 1986

[54] LASER INTERFEROMETER SYSTEM AND METHOD FOR MONITORING AND CONTROLLING IC PROCESSING

[75] Inventors: Dan Maydan, Los Altos Hills; Sasson Somekh, Redwood City; Edward M. Kaczorowski, Santa Clara, all of Calif.

[73] Assignee: Applied Materials, Inc., Santa Clara, Calif.

[21] Appl. No.: 600,189

[22] Filed: Apr. 13, 1984

[51] Int. Cl.⁴ .................... G01B 11/02; G01B 9/02
[52] U.S. Cl. ................................. 356/357; 356/355
[58] Field of Search ............... 356/354, 355, 357, 358, 356/359, 400, 375; 156/626; 250/548, 561

[56] References Cited

U.S. PATENT DOCUMENTS 3,861,804 1/1975 Lehmbeck ........................ 356/357
4,141,780 2/1979 Kleinknecht et al. ............ 356/357
4,367,044 1/1983 Booth et al. ..................... 356/357
4,406,949 9/1983 Spohnheimer ................... 250/561
4,454,001 6/1984 Sternheim et al. ............... 156/626

Primary Examiner—Vincent P. McGraw
Assistant Examiner—S. A. Turner
Attorney, Agent, or Firm—Flehr, Hohbach, Test, Albritton & Herbert

[57] ABSTRACT

A laser interferometer system and associated method for etching endpoint detection, and for monitoring etching or growth to a selected depth. The process implemented by the system involves scanning the laser beam across scribe lines on a wafer which is undergoing fabrication (growth or etching) and monitoring the resulting interference pattern. Alternatively, the process implemented by this system involves moving the laser beam across the scribe line to detect the position of the scribe line; locking the laser beam on the scribe line; and monitoring the resulting interference pattern.

25 Claims, 10 Drawing Figures

LASER INTERFEROMETER SYSTEM AND METHOD FOR MONITORING AND CONTROLLING IC PROCESSING

BACKGROUND OF THE INVENTION

The present invention relates to the fabrication of the constituent layers of an integrated circuit, both to the removal of material, as by etching, and to the formation of layers, as by deposition or growth. In particular, the invention relates to a laser interferometer system and to laser interferometer techniques for monitoring the complete removal of a layer (etching endpoint detection), for forming or etching layers to a predetermined thickness, and for monitoring the associated time rate of change of the thickness.

Semiconductor integrated circuit (IC) fabrication involves the repetitive application of four basic steps: masking, etching, layer formation (deposition or growth) and doping. Relevant to the present invention, under the continuing impetus to achieve greater device densities and faster device speeds, IC technology has evolved from wet chemcial etching to dry etching using techniques such as physical ion etching (sputtering), plasma chemical etching and reactive ion etching (RIE). Of these, sputtering and reactive ion etching are inherently anisotropic and provide a sharply-defined, steep (high aspect ratio), edge profile which is well suited to meeting the stringent resolution and pattern transfer requirements of VLSI geometries. However, even where the dry etchant has a relatively high selectivity for the etched layer as compared to the material underlying the etched layer, some of the underlying material can be etched away as well. As integrated circuit geometries become smaller and smaller and the minimum feature size approaches one micron and even sub-micron dimensions, scaled structural features such as gate oxides become increasingly susceptible to the slightest overetching. For this reason, most state-of-the-art dry etching systems make some provision for endpoint detection. This monitoring technique involves determining the point at which a layer is etched completely through, and terminating the etching process at that point.

There are available several endpoint detection methods. One approach involves monitoring the composition of the gas adjacent the etched layer for the absence of (or a substantially decreased concentration of) the etched material or its compounds. This condition corresponds to the complete etch-through of the layer.

A second approach, emission endpoint, involves monitoring a characteristic emission wavelength, such as the Al line at 3962 angstroms. The etch is terminated when the intensity of the characteristic emission reduces sharply, indicating a reduction in the amount of the etched material in the discharge.

A third endpoint detection approach uses a laser interferometer. Endpoint detection using laser interferometers is based directly upon depth, unlike processes such as chemical composition monitoring, which are based upon indirect indicia of depth. The resulting combination of accuracy and versatility make this an attractive choice for those applications in which the etched material is transparent to the laser light.

The basis for laser interferometer endpoint detection is shown schematically in FIG. 1, which is a cross-sectional representation of a partially fabricated monolithic integrated circuit 9 taken during anisotropic etching using, for example, reactive ion etching. The layer 10 which is being etched can be formed from any of a number of materials used in IC processing which are transparent to laser light, including dielectric materials such as silicon oxide, organic materials, and silicon in either monocrystalline or polycrystalline (polysilicon) form. The illustrated layer 10 is formed on a substrate 12 such as silicon. During RIE etching, reactive ions are accelerated toward the wafer, as indicated at 14, where they bombard the upper surface 16 of the layer 10. The resulting product is then desorbed, removing material from the upper surface. During endpoint monitoring, a beam 18 of coherent laser light is directed perpendicularly or otherwise onto the upper surface 16. Because of the difference between the refractive indices of the ambient atmosphere and the layer 10, the laser beam is partially reflected at the interface 16 as well as at the interface 17 between the layer 10 and the substrate 12. The interference phenomenon is governed by $2d = N(\lambda/n)$, where d is the thickness of layer 10, $\lambda$ is the wavelength of the light and n is the refractive index. For integral values, $N = 1, 2, 3 \ldots$, the reflected light interferes constructively and the reflected intensity is a maximum; for $N = \frac{1}{2}, 3/2, 5/2 \ldots$, the interference is destructive and the reflected intensity is at a minimum. This principle of operation is well known. It bears repeating here, however, that the distance between adjacent maxima, $\frac{1}{2}(\lambda/n)$, is one-half the effective wavelength of the laser light in the layer 10. This distance provides a convenient basis for determining the thickness of material which has been removed from layer 10 and the time rate of etching. In addition, the characteristic sinusoidal interference pattern of repetitive maxima and minima terminates upon the completion of etching, that is, upon complete removal of the layer 10 to the interface 17. Graphical or electrical monitoring of this change in the interference pattern provides endpoint detection for the purposes of terminating the etch process at the interface 17.

Despite the described versatility, conventional laser interferometer endpoint detection has several important limitations which are addressed by the present invention. Referring to FIG. 2, the first problem relates to the relatively large size of the laser beam 18 relative to certain etch geometries, such as the illustrated contact window 20. Typically, contact windows are very small apertures which are etched through dielectric layers such as the layer 10 using a patterned mask 22. The windows provide vias for making contact to an underlying layer 12, such as a polysilicon gate or conductor, or a substrate contact region. Although FIG. 2 is not to scale, it illustrates somewhat the enormous difference in size between the typical 1–3 micron diameter contact windows 20 and the typical 700 micron diameter laser beam 18. Because of this size difference, etching contact holes in a wafer involves etching only about one percent of the area exposed to the laser beam. The interference signal associated with the etching process is thus very small compared to the background signal and is difficult to detect.

A second problem associated with laser interferometer endpoint detection relates to the topography of the wafer as the IC structure is evolved. Simply stated, the different heights inherent in the IC structure and the angled reflecting surfaces of the IC structure scatter the incident light beam and, again, make it difficult to detect the etching signal.

SUMMARY OF THE IVENTION

Because of the potential accuracy and versatility of laser interferometer endpoint detection systems, it is one object of the present invention to provide a laser interferometer system and methods for accurately monitoring the etching endpoint during the removal of a layer of material.

It is another object of the present invention to provide a laser interferometer system and methods for monitoring and controlling the process of etching layers or forming layers (i.e., growing or depositing layers) to a predetermined thickness.

It is still another object of the present invention to provide a laser interferometer system and methods for monitoring the time rate of change of thickness associated with complete removal of a layer, or with etching or forming a layer to a predetermined thickness.

In one aspect, the present invention relates to a laser interferometer system for monitoring the change in thickness of a layer of material being fabricated on a substrate. In this aspect, the system comprises a lens for focusing a beam of coherent light such as a laser beam to a beam spot on a substrate; a scanning system for repetitively scanning the focused beam spot across a selected dimension of the substrate to repetitively intersect a selected substrate feature which is covered by the layer and is substantially devoid of optically degrading structural features, to thereby generate a phase difference in the reflected beam which is indicative of the thickness of the layer over the selected feature; detection means responsive to the resulting phase difference in the beam of light for generating a signal representative of the phase difference; and means responsive to a selected signal value representative of a preselected extent of fabrication for generating an output signal to terminate fabrication.

In another aspect, the present invention relates to a laser interferometer system for monitoring the change in thickness of a layer of material being fabricated on a substrate, comprising a lens for focusing a coherent beam of light to a beam spot on a substrate; means for controllably moving the focused beam spot across a selected dimension of the substrate encompassing a selected feature which is covered by the layer and is substantially devoid of optically degrading structural features, to thereby generate a phase difference in the reflected beam which is indicative of the thickness of the layer; detection means responsive to the resulting phase difference in the beam of light for generating an output signal representative of the phase difference; control means responsive to the signal for terminating movement of the beam spot by the moving means at a point on the substrate intersecting the selected feature, and further responsive to the signal reaching a second value corresponding to a selected extent of fabrication, for generating an output signal to terminate fabrication.

In both the above-described aspects of the invention, alternatives for effecting termination of the beam spot movement and the fabrication process itself range from counter circuits to program controllers to programmed general purpose computers.

In a related aspect, the invention comprises a process for monitoring the change in thickness of a layer of material which is being etched or formed on a substrate, based upon the change in thickness of the layer over a selected feature which is covered by the layer, and is substantially devoid of optically degrading structural features comprising focusing a coherent beam of light to a beam spot on the substrate of size which is determined by the size of the selected feature, repetitively scanning the beam spot across the selected feature to generate an optical interference signal which is characteristic of the repetitive scanning and of the thickness of the selected substrate feature, and converting the optical signal to a corresponding electrical signal adapted for monitoring the fabrication process.

In addition, the present invention relates to a process for monitoring the change in thickness of a layer of material being fabricated on a substrate as described above by the process of focusing a coherent beam of light such as a laser beam to a beam spot on the substrate of size determined by the size of the selected feature, controllably moving the beam spot across the substrate to intersect the selected substrate feature while monitoring the resulting optical interference signal, stopping the movement of the beam spot upon reaching a first value of the optical signal characteristic of the selected substrate feature to thereby focus the beam on the selected substrate feature; fabricating the layer to generate a second optical signal which is characteristic of the changing thickness of the layer which is undergoing fabrication; and converting the second signal into a corresponding electrical signal for monitoring the fabrication process.

In both of the above-described methods for monitoring a fabrication process, the aspect of monitoring includes control of the process, such as terminating the fabrication process.

In a preferred working embodiment of the monitoring apparatus and process, the selected substrate location is a scribe line.

Additional working embodiments of the monitoring process involve the use of the electrical output signal to determine the time rate of change of thickness of the layer; and the use of the electrical output signal to terminate the fabrication process upon substantially complete etching of the thickness of the layer, as well as upon reaching a selected thickness of etched or grown material. These and other features of the present invention are described in detail in reference to the associated drawings in which.

Figure 1:
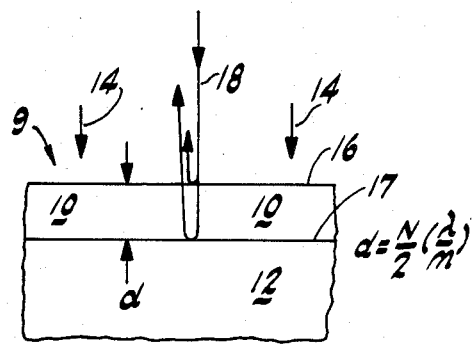
FIG. 1 is a cross-sectional representation of a partially completed integrated circuit schematically illustrating the use of prior art laser interferometer techniques for endpoint detection.
Figure 2:
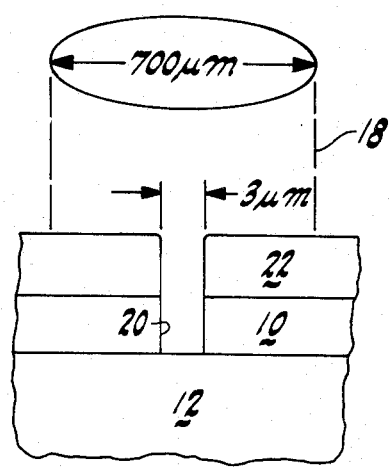
FIG. 2 is a cross-sectional representation of a partially completed integrated circuit schematically illustrating the use of a laser interferometer process for monitoring the etch patterning of contact windows and further illustrating the large difference in size between the laser beam and the contact window.
Figure 3:
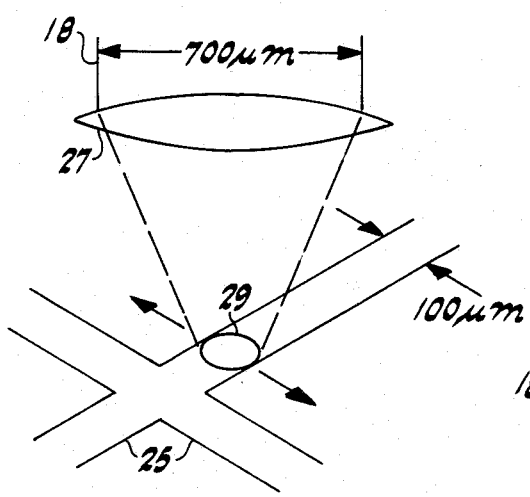
Figure 4:
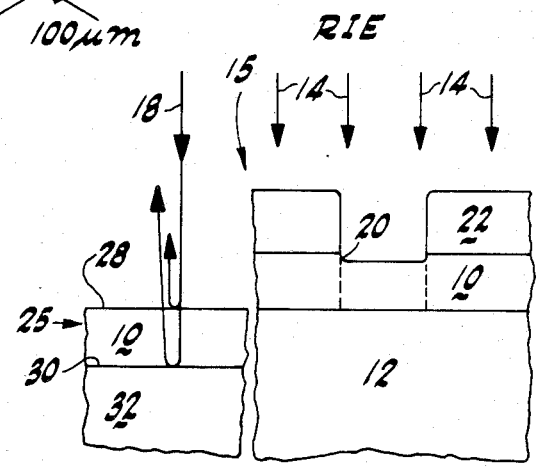
Figure 5:
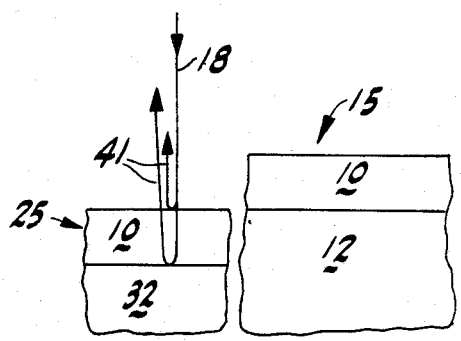
Figure 6:
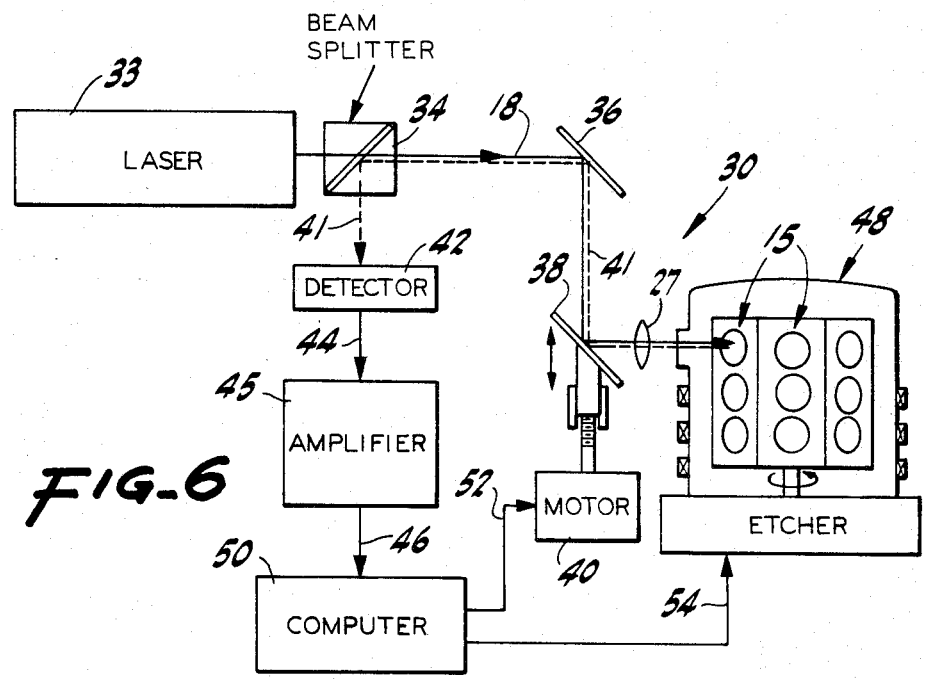
Figure 7:
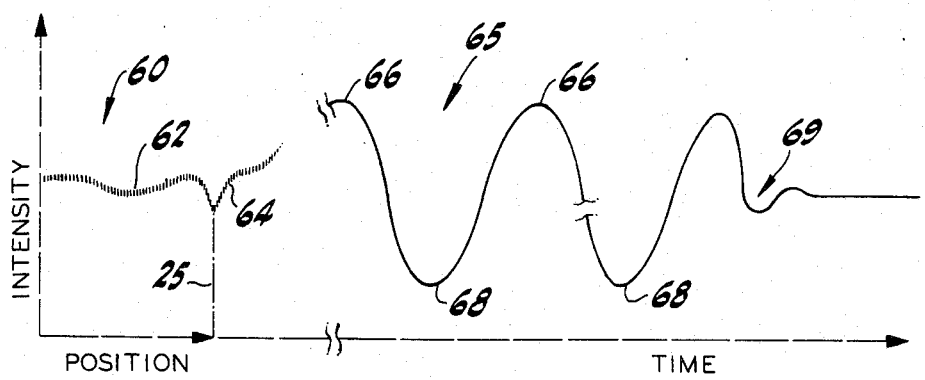
Figure 8:
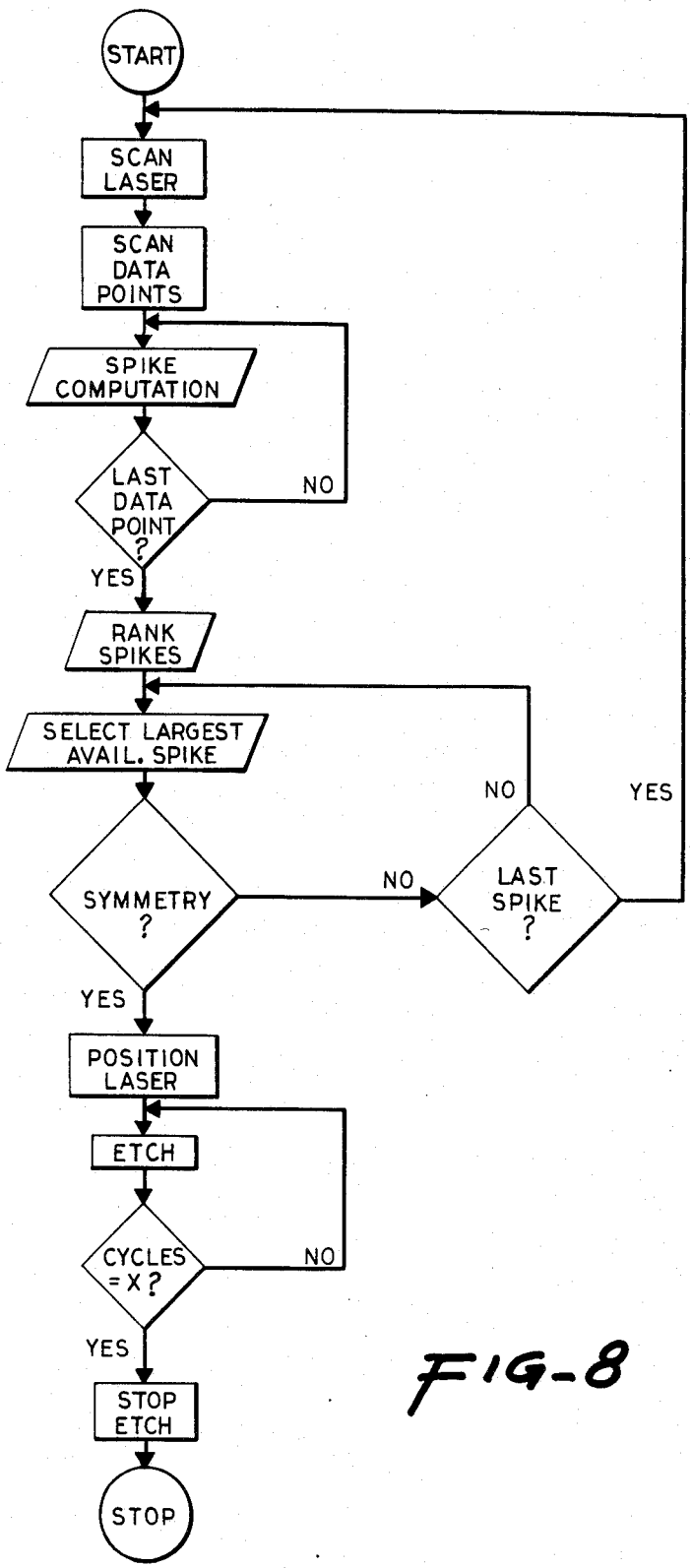
Figure 9:
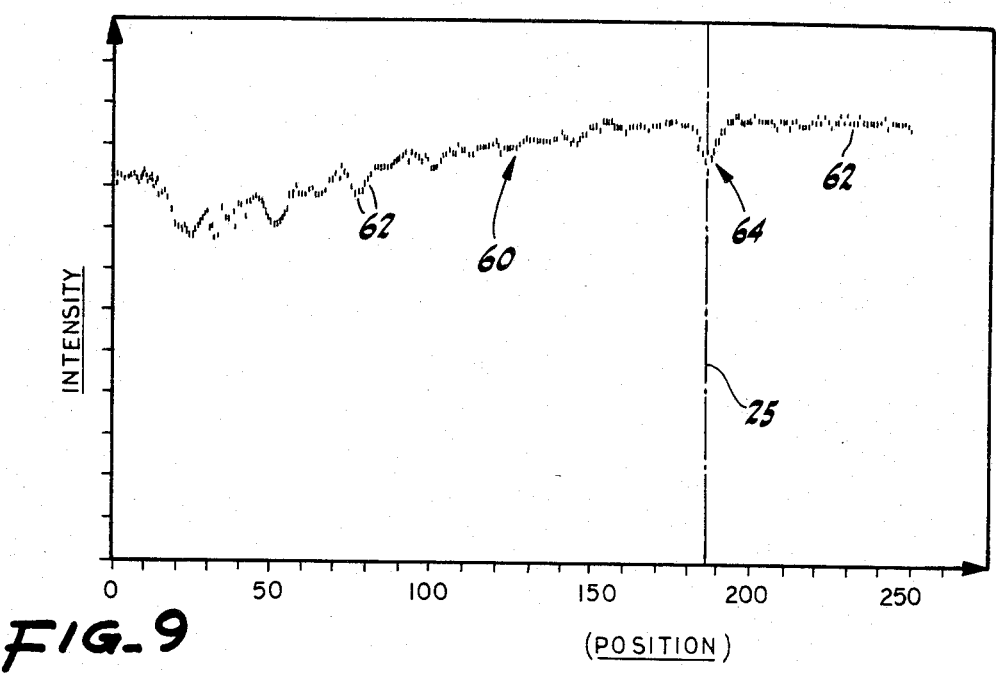
Figure 10:
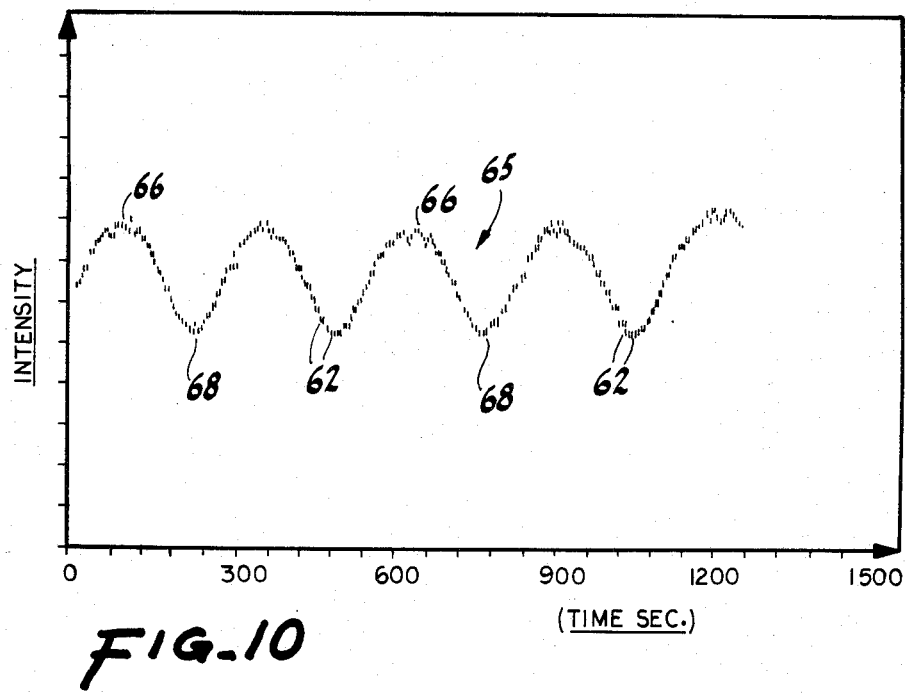

FIG. 3 schematically illustrates the approach of the present invention for increasing the efficiency of laser endpoint detection by focusing the laser beam into a beam commensurate in size with a scribe line and moving or scanning the beam spot across the scribe line;

FIGS. 4 and 5 are cross-sectional representations of a partially completed integrated circuit taken, respectively, during an etching sequence and a growth/deposition sequence which utilize the laser interferometer monitoring process of the present invention;

FIG. 6 illustrates a working embodiment of the laser interferometer monitoring system of the present invention;

FIG. 7 is a representation of a typical graphical output of the present monitoring process in the form of a strip chart recording;

FIG. 8 is a flow chart illustrating computer implementation of an algorithm for laser monitoring of a semiconductor fabrication process; and FIGS. 9 and 10 are computer printouts taken during the monitoring process of the present invention.

DETAILED DESCRIPTION OF THE INVENTION

Referring to FIG. 3, in one aspect the present invention involves focusing the laser beam 18 via a lens or lens system 27 into a beam spot 29 the size of which is based upon the size of a scribe line 25 or other selected substrate feature; repetitively scanning the beam along the IC substrate along a path of sufficient length so that the laser repeatedly intercepts a scribe line; then monitoring the optical interference pattern associated with the scribe line and thereby monitoring the fabrication process which the wafer is undergoing. This is the "repetitive scanning" mode. Alternatively, the scanning sequence involves moving the focused beam spot a sufficient distance along the substrate to intersect a scribe line and to detect the scribe line via the beam optics; then locking or positioning the beam on the scribe line; and using the resulting, typically cyclical or sinusoidal optical interference pattern to monitor the fabrication process. This latter process is called the "scan, detect and lock" mode or sumply the "scan and lock" mode. Typically, the laser beam can be scanned or moved at right angles to one of the xy arrays of parallel scribe lines and over a distance which exceeds the typical spacing between scribe lines to ensure that the beam will intersect a scribe line during the scanning sequence used in either mode of operation.

The beam spot can be the same size as, larger than, or smaller than the width of the scribe line 25. The important thing is that the laser beam is focused to a relatively small spot which eliminates the existence of a size difference between the beam spot and the scribe line (or other selected feature) which would provide a weak optical signal.

FIG. 4 illustrates schematically the objective of the present invention in terms of focusing the laser beam 18 onto a scribe line 25 during a fabrication operation such as etching. As described previously, the exemplary reactive ion etching process involves etching a layer 10 of material such as silicon oxide, organic material or polysilicon which is formed on a base 12. Typically, the base 12 is a polysilicon conductor or a single crystal silicon substrate. The illustrated etching step involves the use of an etching mask 22 to form contact windows in layer 10. As mentioned previously, the small size of the etched pattern relative to that of the laser beam 18, and the structural topography of the partially-completed integrated circuit would provide a small detection signal and scatter the incident beam if the beam were directed to the region of base 12. Both of these phenomena make laser interferometer detection difficult. According to the present invention, however, the laser beam is not simply directed randomly at the integrated circuit topography, but is aligned on or intersects a scribe line 25. As those of skill in the art will appreciate, scribe lines are xy lines of approximately 100 micron width which serve as guidelines for sawing and separating the individual dice of the wafer. For this reason, scribe lines are normally maintained free or substantially free of IC structure and the only structure on the scribe line surface 30 is the layer 10 which is being etched. It should be noted that the scribe line surface 30 is the surface of the semiconductor substrate 32 whereas the layer 12 may also be the semiconductor substrate, at least early during the wafer fabrication sequence. The different reference numerals (12 and 32) are used to indicate the likelihood that layer 12 is a feature which is formed during the process of fabricating the particular integrated circuit.

Focusing the beam spot to a relatively small size on the scribe line increases the strength of the interference signal. Also, because the scribe lines are normally maintained essentially free of structure (other than for the layer which is being formed on the IC), and because the layer interfaces 28 and 30 thus adopt the relatively smooth planar contour of the underlying substrate 10, the signal losses of prior art techniques are substantially eliminated. Thus, as a consequence of focusing the laser beam and monitoring the fabrication of a layer over a scribe line, the present invention eliminates the two previously-mentioned primary sources of signal attenuation. In addition, the two scanning and monitoring sequerices described above ensure that the scribe line(s) can be readily and accurately detected and, thus, can be used effectively for monitoring the process of fabricating the layer 10. Those of usual skill in the art will understand that while the use of scribe lines is preferred, other regions or features of the integrated circuit can be used for the fabrication monitoring process which are substantially devoid of structure other than layer 10, or are otherwise smoothly contoured and do not scatter or interfere with or otherwise optically degrade the monitoring signal developed by the laser beam.

FIG. 5 is a cross-sectional view of a semiconductor wafer in the manner of FIG. 4 illustrating the critical position of the incident laser beam 18 during a film growth or deposition sequence. Here, layer 10 is being formed on layer 12, and the laser 18 is being used in the manner of FIG. 4, but to monitor the increasing thickness of the layer.

Before considering the fabrication and mcnitoring system shown in FIG. 6, it may be helpful to consider the type of graphical output which is provided by a scanning laser beam and by a fixed laser beam. The two types of graphical output are shown in the computer printouts of FIGS. 9 and 10. FIG. 9 illustrates the graphical output which is provided when the focused laser beam 18 is scanned or moved over a scribe line 25. The laser and associated monitoring system (FIG. 6) provide a curve 60 comprising individual data points 62—62 which form sharp symmetrical "spikes" (peaks (not shown) and troughs such as 64) at the scribe lines 25. The short chart segment 60 was generated during translational movement of the laser beam 18 to detect a scribe line, i.e., during the scan, detect and lock technique. However, curve 60 is also representative of the graphical output which would be provided during a reciprocal laser beam scanning which is used during the repetitive scanning mode of operation.

FIG. 10 illustrates the type of graphical output which results when the laser beam 18 is fixed or locked onto the scribe line 25 during the process of monitoring the fabrication of the layer 10 (as by etching) using the scan, detect and lock mode of operation. The curve 65 is typical of the cyclical interference function which is generated when the laser beam 18 is focused on layer 10 over a scribe line 25 while material is being formed on or etched from the layer. Under optimum conditions, this particular function is sinusoidal. As mentioned previously, the distance between adjacent maximum values 66 or adjacent minimum values 68 provides a convenient basis for detecting the changes in thickness and for detecting the time rate of etching.

FIG. 6 discloses one example of a laser interferometer system 30 which is used for the above-described laser scanning methods during the processing of wafers 15—15 by a system such as 48. For the purpose of illustrating the use of the present invention, etching is discussed herein. However, the invention is also applicable to the formation (growth/deposition) of layers, and etching system 48 could be, or could be replaced by, a system for growing/depositing layers.

The system 30 includes a conventional laser 33, the beam 18 of which is applied via beam splitter 34 and stationary mirror 36 to a translatable scanning mirror 38 which scans the laser beam along wafer 15 and across scribe line 25 (FIG. 3) located on the wafer. The mirror 38 is scanned by a linear stepper motor 40. Operation of the motor 40 and the etcher 48 can be controlled by a computer 50 which applies signals over drive output line 52 and communication channel 54, respectively, to start/stop a particular laser beam scanning movement and to start/stop the etching operation.

The reflected components 41 of the laser beam 18 are directed by the mirrors 38 and 36 to beam splitter 34, where they are separated from the path of the incident beam 18 and directed to detector circuit 42. The reflected beam components cause the detector 42 to generate an analog electrical output signal which is applied over line 44 as input to amplifier 45. The analog signal is amplified and then applied to the computer 50 for use by the computer in monitoring and controlling scanning and etching.

The computer 50 is configured to use the amplified detector signals to determine when a preselected etching depth (or endpoint) has been reached. For example, in one implementation, the computer counts the number of maxima (or minima) or other points or values of the signal and thereby determines when a preselected etching depth has been reached. The computer also recognizes the etching endpoint based upon the cessation of signals from amplifier 45 associated with etching (formation). The computer responsively applies signals which are representative of the endpoint and/or etch rate and/or etch depth over communication channel 54 to the etching system 48. These signals cause the etching system 48 to alter the etch rate and/or terminate etching.

In an actual working embodiment of the system 30, the laser 33 was a helium laser. Beam splitter 34 was a conventional optical beam splitter. A 25 cm focal length lens 27 was used. The motor 40 was a stepping motor having steps of 0.05 mm. Detector 42 was a conventional silicon diode detector. The computer 50 can be any number of program controllers or small general purpose computers. One suitable computer which was used was the Apple II-plus; communication between the computer 50 and the etching system 48 was via an RS232 interface. The illustrated etching system 48 was an AME 8100 Series Plasma-Etch System available from Applied Materials, Inc. of Santa Clara, California, specifically Model No. 8110. The AME 8100 Series is illustrative of the type of etch systems which are particularly suited for use in system 30 in that this etch system has the capability to measure etch rate and to terminate etching upon reaching the endpoint, based upon the signals received over communication channel 54 from the computer 50.

The use of a lens system 27 having an adjustable focal length facilitates adaptation of the beam spot to different dimensions of the scribe line 25 and other selected features.

Considering now the repetitive scan mode of operation and referring further to FIG. 6, the reciprocal scanning movement of the laser beam 18 by the motor 40 can be initiated by a manually-operated switch or by a computer signal over line 52. The dimension of the reciprocal scan is greater than the distance between scribe lines (along the scan path) to ensure that the laser intersects a scribe line. Conveniently, the scan dimension is adjustable to accommodate different dimensions between scribe lines. Next, operation of the etcher 48 is started, by a manually-operated switch or by a computer signal applied via communications line 54. During the resulting scanning and etching, amplified signals from the detector 42 are used by the computer 50 to determine the thickness which has been etched and to determine the etching end point. Upon reaching the predetermined etch thickness or the end point of etching, the computer applies signals via line 52 and communication channel 54 to terminate scanning by the motor 40 and to terminate the etch process.

The scan, detect and lock mode of operation is facilitated by reference to FIG. 7, as well as to FIG. 6. FIG. 7 includes schematized versions of the strip chart recordings shown in FIGS. 9 and 10. Initially, the motor 40 is actuated to translate the mirror 38 and thereby move the laser beam 18 across the wafer 15 a sufficient distance to intersect one or more scribe lines 25. Upon detection of an amplified signal from detector 42 indicating the presence of a spike 64, the computer 50 signals over line 52 to stop the motor 40 and to position the laser beam 41 in registration with the scribe line 25. The computer 50 also signals the etcher 48 via the communication channel 54 to initiate etching. Alternatively, etching can be started manually once the laser beam 41 is locked onto the scribe line. Once etching is initiated, the detector 42 supplies signals to the computer corresponding to the cyclical sinusoidal function 65 shown in FIG. 7. As mentioned previously, in one embodiment the computer 50 uses the signals associated with the maxima 66 and/or minima 68 to monitor the thickness which has been etched and, after a predetermined amount of etching, signals the etcher 48 via communication channel 54 to stop the etching. If the layer is to be etched completely through, cessation of the cyclical maxima/minima, indicated at 69, is recognized by the computer 50, which signals the etcher 48 to terminate etching.

FIG. 8 is a flow chart of a simple computer program which has been used to implement the above-described scan, detect, lock and monitor sequence. The key features of the program are two tests which are incorporated in the scribe line detection algorithm. The first is a spike detection test; the second is a symmetry test.

Regarding the spike detection test, it has been found that scribe lines usually appear as negative or positive spikes in laser scan outputs. These local peaks or trenches can be detected by comparing the value of a central data point with the average of several data points immediately before and after the central data point. A peak is indicated whenever the central data point is higher in value than the average value of points surrounding it. Similarly, a trench is indicated whenever the central data point is a lower value than the average value of the points surrounding it. The computer program makes this calculation for every point in the laser scan output data in order to find and rank spikes in descending magnitude, from the largest spike to the smallest spike.

Another characteristic discovered of scribe lines is that they exhibit symmetry about the center line of the spike. Thus, a symmetry test is performed by comparing the averages of the data points on either side of the previously-identified spikes. If an individual spike is symmetrical, the average of the data points before the spike and after the spike will be approximately equal.

With this knowledge of the spike detection and symmetry tests, consider now the flow chart of FIG. 8 for the scan, detect and lock mode of operation. Initially, the laser beam 18 is scanned (translated) across the wafer 15 and the amplified signals from detector 42 are applied to the computer as scan data points. The computer performs the above-described spike detection computation for each data point associated with the particular scan. Then, after determining that the computation has been made for the last data point, the computer ranks the spikes in descending order of magnitude and selects the spike having the largest magnitude. After the initially selected spike or a subsequent spike is determined to be symmetrical, the computer 50 signals the motor 40 via line 52 to hold the laser beam 18 at the position of the selected spike (and thus at its associated physical scribe line 25) and signals etcher 40 via channel 54 to commence etching. The particular monitoring process is designed to terminate etching after x number of cycles, where x provides the desired etch depth. However, the program and process are readily modified to substitute or add end point detection and other monitoring features.

In addition, the program can be modified so that the computer goes to the next largest spike or activates an alarm if proper interferometer etching signals are not received. Also, the program can be designed to compensate for the case where a scribe line is not detected, by initiating etching and then re-scanning. The computer program can be configured to use signal values other than peak (maxima or minima) values, such as half-cycle values. In addition, and especially when using a fast etching process (or other fabrication process), it may be useful to program the computer to stop etching at a calculated point between cycles which corresponds to the desired etch depth.

Those of skill in the art will readily understand that the monitoring system 30 shown in FIG. 6 can be modified in various aspects and remain within the scope of the invention. For example, it is possible to use scanning arrangements which eliminate the beam splitter 34. The important aspect is the use of translational or reciprocal scanning in conjunction with beam focusing to detect a scribe line and the use of the scribe line to enhance the laser interference signal. In addition, other types of interference signals can be generated and detected using the described system and either scanning mode and variations thereof which are within the scope of the invention. For example, the laser beam can be used to generate a diffraction interference pattern from an appropriate repetitive array of IC features, such as repetitively spaced lines filling the scribe lines, as well as optical reflection from a specific feature such as a scribe line. As one example of this latter case, the different reflectivities of materials such as aluminum and tungsten can be used to monitor the endpoint of etching of aluminum formed on tungsten.

What is claimed is:

1. A process for monitoring the change in thickness of a layer of material being fabricated on a substrate as by one of etching, growth or deposition, based upon the change in thickness of the layer on a substrate scribe line or other selected feature, comprising focusing a laser beam to a beam spot on the substrate, the focused beam spot being of a small size selected based upon the size of the selected feature, for providing an enhanced signal-to-noise ratio; repetitively scanning the beam spot across the selected feature to generate an optical interference signal characteristic of the repetitive scanning and the thickness of the selected substrate feature; and converting the optical signal into a corresponding electrical signal adapted for monitoring the fabrication process.

2. The monitoring process of claim 1 wherein the optical signal contains peak which are characteristic of the selected substrate feature.

3. The monitoring process of claim 1 wherein the optical signal is cyclical, characteristic of the changing thickness of the layer being fabricated.

4. The monitoring process of claim 1 wherein the optical signal results from and is characteristic of optical diffraction.

5. The monitoring process of claim 1 wherein the optical signal results from and is characteristic of optical reflection.

6. The monitoring process of claim 1 wherein the scanning is started before starting the fabrication of the layer.

7. The monitoring process of claim 1 wherein the scanning is started after starting the fabrication of the layer.

8. The monitoring process of claim 1 wherein the process comprises etching of the material of the layer from at least a region over the substrate and wherein the electrical signal corresponds to substantially complete removal of the thickness of the layer from the region.

9. The monitoring process of claim 1 wherein the fabrication process comprises etching of the material of the layer from at least a region over the substrate and wherein the electrical signal corresponds to removal of a selected thickness of the material.

10. The monitoring process of claim 1 wherein the fabrication process comprises growth or deposition of the material of the layer over at least a selected area of the substrate and wherein the electrical signal corresponds to the formation of a selected thickness of the material.

11. The monitoring process of claim 1 wherein the laser beam is adjustably focused.

12. The monitoring process of claim 8 wherein the electric output signal drives a corresponding graphical display of the process monitoring information.

13. A process for monitoring the change in thickness of a layer of material being fabricated on a substrate as by one of etching, growth or deposition, based upon the change in thickness of the layer over a substrate scribe line or other selected feature, comprising focusing a laser beam to a beam spot on the substrate, the focused beam spot being of a small size selected based upon the size of the selected feature, for providing a high signal-to-noise ratio; controllably moving the beam spot across the substrate to intersect the selected substrate feature while monitoring the resulting first optical interference signal; stopping the movement of the beam spot upon reaching a predetermined value of the optical signal characteristic of the selected substrate feature to thereby focus the beam on the selected substrate feature; fabricating the layer and thereby generating a second optical signal characteristic of the changing thickness of the layer; and converting the second optical interference signal into a corresponding electrical signal for monitoring the fabrication process.

14. The process of claim 13 wherein the first optical signal comprises peak values, characteristic of the moving beam spot intersecting the selected substrate feature.

15. The monitoring process of claim 13 wherein the second optical signal results from, and is characteristic of, optical diffraction.

16. The monitoring process of claim 13 wherein the second optical signal results from, and is characteristic of, optical relection.

17. The process of claim 13 wherein the second optical signal is cyclical, characteristic of the changing thickness of the layer being fabricated.

18. The monitoring process of claim 13 wherein the electrical signal represents the time rate of change of thickness.

19. The monitoring process of claim 17, further comprising the step of stopping the fabrication process upon reaching a selected number of signal cycles.

20. The monitoring process of claim 19, wherein the process comprises etching the material of the layer from at least a region over the substrate, and wherein the selected number of cycles corresponds to substantially complete removal of the thickness of the layer from the region.

21. The monitoring process of claim 19 wherein the fabrication process comprises etching of the material of the layer from at least a region over the substrate and wherein the selected number of cycles corresponds to removal of a selected thickness of the material.

22. The monitoring process of claim 19 wherein the fabrication process comprises growth or deposition of the material of the layer over at least a selected area of the substrate, and wherein the selected number of cycles corresponds to the formation of a selected thickness of material.

23. The monitoring process of claim 20 wherein the electric output signal drives a corresponding graphical display of the process monitoring information.

24. A process for monitoring the varying thickness of a layer of material being fabricated on a semiconductor substrate, comprising scanning a focused beam of collimated light in a reciprocal path between scribe lines on the substrate while monitoring the resulting optical interference pattern of peak values; the scanning path length being longer than the distance thereon between adjacent scribe lines and the cross-sectional width of the focused beam being substantially the same dimension as the width of the scribe line; and stopping the fabrication process upon reaching a selected one of said peak values corresponding to a selected thickness change.

25. A process for monitoring the varying thickness of a layer of material being fabricated on a semiconductor substrate comprising moving a focused beam of collimated light along a path between scribe lines on the substrate while monitoring the resulting optical interference signal comprising at least a selected peak value; the path length being longer than the distance thereon between adjacent scribe lines and the cross-sectional width of the focused beam being based upon the width of the scribe line; stopping the scanning at the selected peak value to position the beam at a scribe line; monitoring the resulting optical signal; and stopping the fabrication process upon reaching a selected point corresponding to a selected thickness change.

* * * * *